United States Patent [19]

Boshek

[11] Patent Number: 5,047,887
[45] Date of Patent: Sep. 10, 1991

[54] METHOD AND APPARATUS FOR CLEANING THE TAPE HEAD AND TAPE PATH OF A VIDEO CASSETTE RECORDER USING A WETTED CLEANING TAPE

[75] Inventor: Ernest D. Boshek, San Jose, Calif.

[73] Assignee: Tandy Corporation, Ft. Worth, Tex.

[21] Appl. No.: 457,986

[22] Filed: Dec. 28, 1989

[51] Int. Cl.$^5$ .............................................. G11B 5/41
[52] U.S. Cl. ................................................... 360/128
[58] Field of Search ......................................... 360/128

[56] References Cited

U.S. PATENT DOCUMENTS

| | | | |
|---|---|---|---|
| 4,387,411 | 6/1983 | Clausen et al. | 360/128 |
| 4,462,056 | 7/1984 | Kara | 360/128 |
| 4,498,113 | 2/1985 | Clausen et al. | 360/128 |
| 4,580,185 | 1/1986 | Clausen et al. | 360/128 |
| 4,594,629 | 6/1986 | d'Alayer de Costemore d'Arc | 360/128 |
| 4,616,283 | 10/1986 | Clausen et al. | 360/128 |
| 4,616,284 | 10/1986 | Fritsch | 360/128 |
| 4,698,712 | 10/1987 | Fritsch | 360/128 |
| 4,761,700 | 8/1988 | Fritsch | 360/128 |
| 4,811,149 | 3/1989 | Clausen | 360/128 |
| 4,855,856 | 8/1989 | Matsuoka | 360/128 |

FOREIGN PATENT DOCUMENTS

| | | |
|---|---|---|
| 3527373 | 2/1987 | Fed. Rep. of Germany . |
| 61-71409 | 4/1986 | Japan . |
| 61-71410 | 4/1986 | Japan . |
| 61-120320 | 6/1986 | Japan . |
| 61-120321 | 6/1986 | Japan . |
| 63-2112 | 1/1988 | Japan . |
| 63-2113 | 1/1988 | Japan . |
| 1133214 | 5/1989 | Japan . |
| 2175435 | 11/1986 | United Kingdom . |

Primary Examiner—Robert S. Tupper
Attorney, Agent, or Firm—Townsend and Townsend

[57] ABSTRACT

A cassette device for cleaning portions of a video cassette recorder is provided. The cassette device includes a first fluid applicator and a second fluid applicator, the second fluid applicator positioned to wet a portion of tape spaced from the portion wetted by the first applicator. Preferably, the second applicator also acts to position the tape to be spaced from the scanner in one circumferential portion of the scanner. A device is provided for contacting the tape along a defined circumferential portion of the first applicator to assure substantially continuous rotation of the first applicator without direct-driving the first applicator.

21 Claims, 3 Drawing Sheets

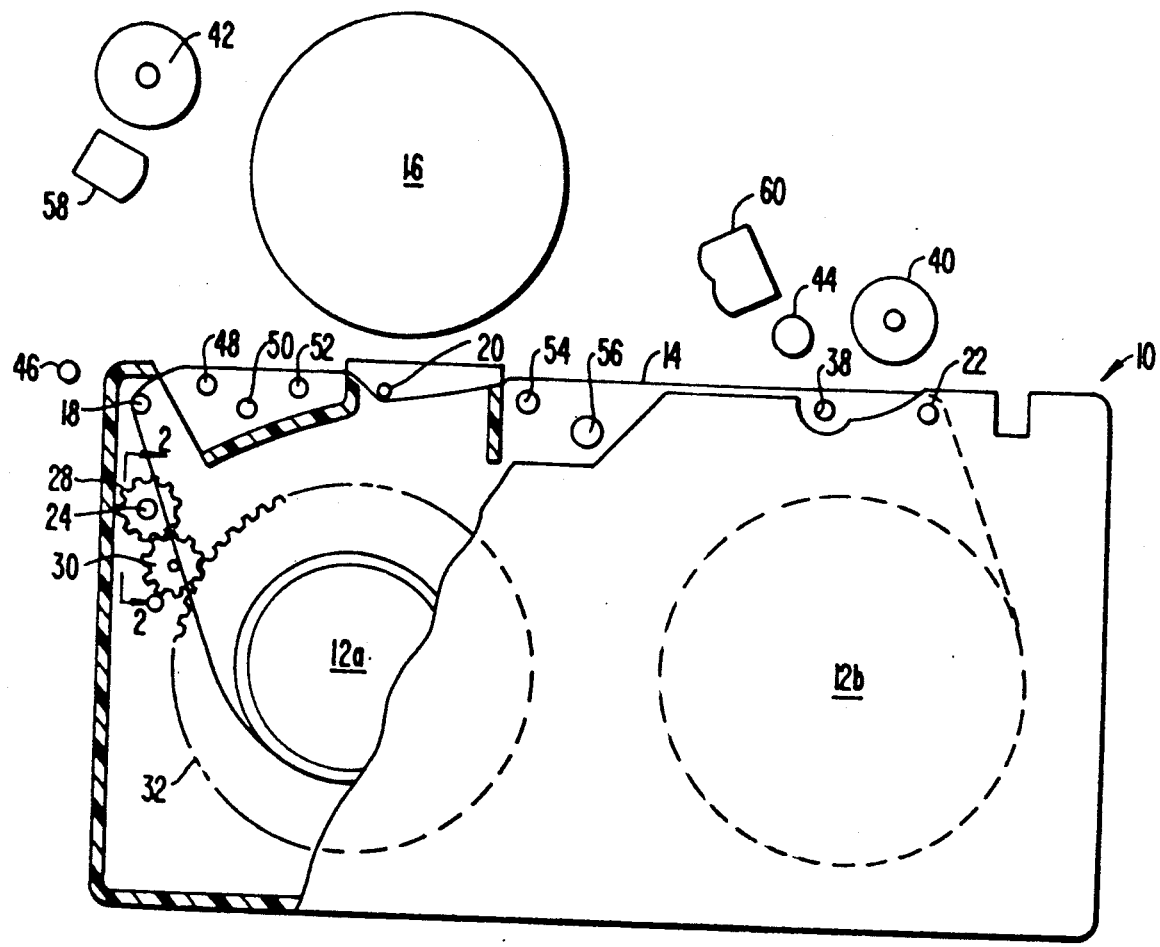
FIG._1. PRIOR ART
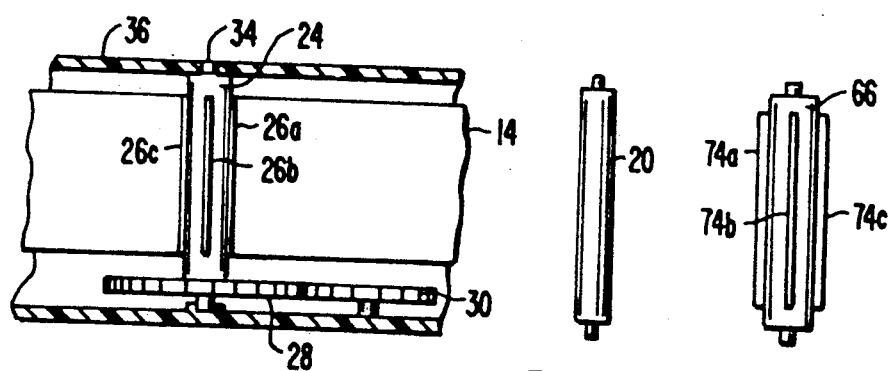
FIG._2. PRIOR ART   FIG._4. PRIOR ART   FIG._6.

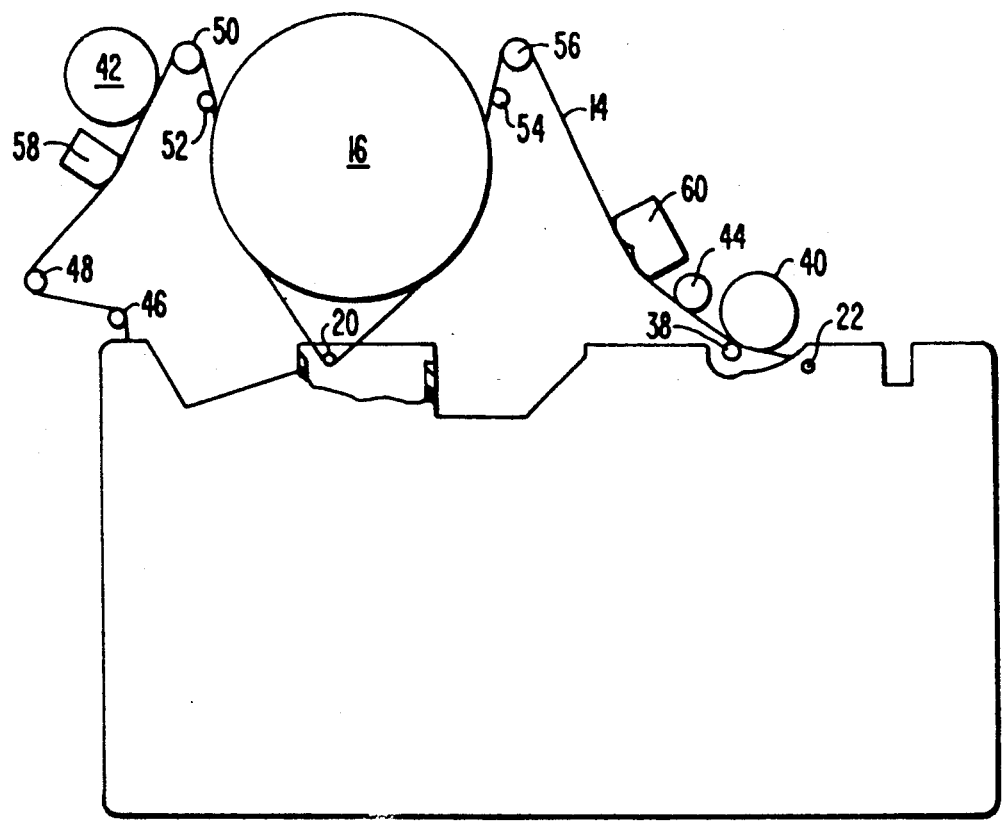
FIG._3. PRIOR ART
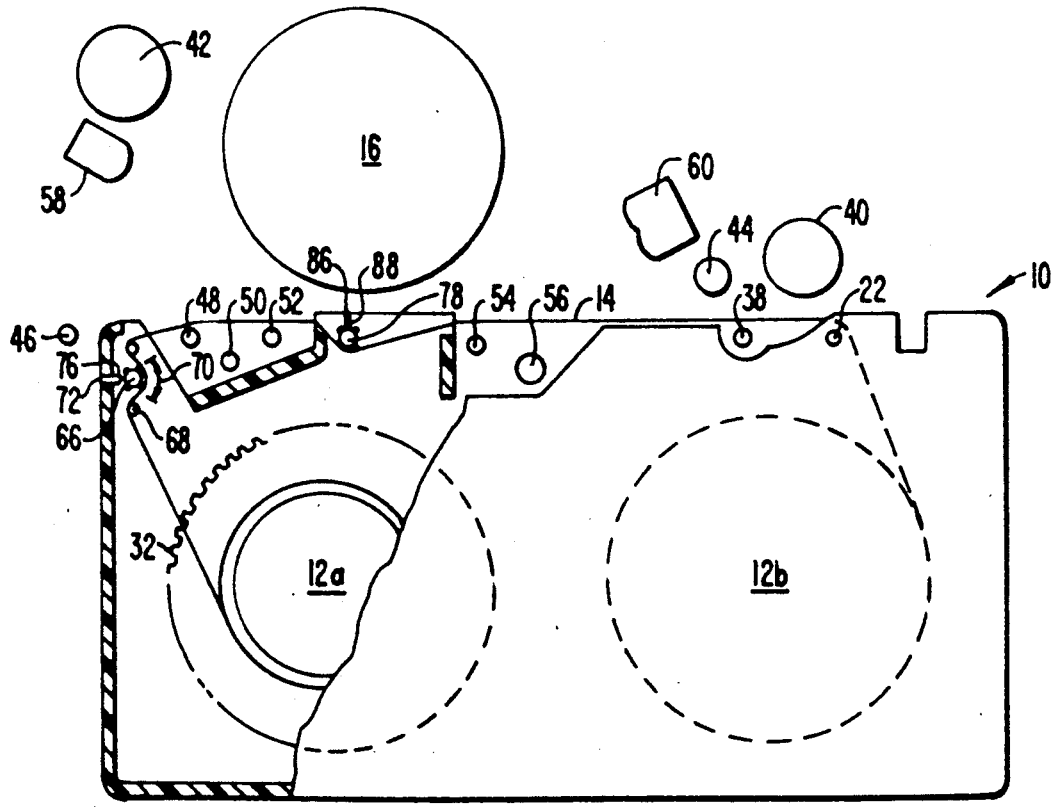
FIG._5.

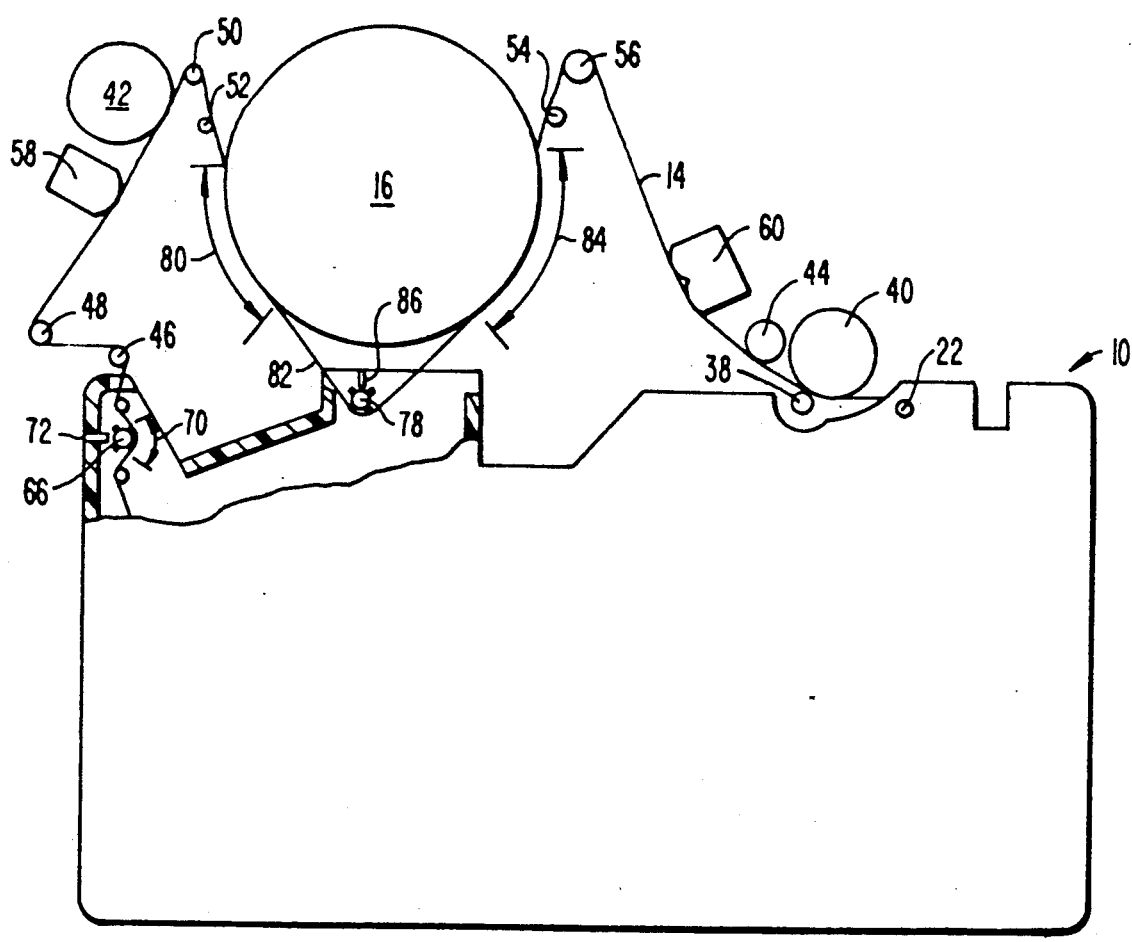
FIG._7.

METHOD AND APPARATUS FOR CLEANING THE TAPE HEAD AND TAPE PATH OF A VIDEO CASSETTE RECORDER USING A WETTED CLEANING TAPE

BACKGROUND OF THE INVENTION

The present invention relates to cleaning portions of a video recorder and, in particular, to a cassette device, including a tape for cleaning the recording, erasing, and other heads of the video cassette recorder.

In a typical video recorder, such as a video cassette recorder, a tape is configured to move across the surface of one or more recording or erasing heads. During use, particles from the tape and/or foreign objects become deposited on the recording or erasing heads or other portions of the recording device, such as the capstans, guides, and the like. Deposition of such materials on the recording heads interferes with their efficient operation. Deposition on the heads, as well as on other portions of the recording device, can also result in redeposition of unwanted oxides on the tape.

Devices have been provided for removing some or all of such deposited particles from portions of the recorder mechanism. Some devices clean by moving a dry tape material across the apparatus to be cleaned. Other devices include apparatus for wetting a portion of the tape to be moved through the recorder apparatus.

In previous devices, the tape extends from a rotatable feed reel or hub to a rotatable takeup real or hub. Mechanisms in the recorder rotate the hubs to provide longitudinal motion of the tape. The speed of the longitudinal motion is typically controlled by a rotating capstan in the recorder. A video cassette includes tape guides which cooperate with guides or rollers in the recorder to position the tape along the desired path.

Previous cassettes intended for the wet-cleaning method include a rotatable fluid applicator for wetting a portion of the tape. The fluid applicator is rotated by gear teeth circumferentially disposed along a hub connected to the applicator. The applicator gear teeth engage, directly or indirectly, teeth along the circumferential portion of the takeup or feed reel or hub. Thus, when the recorder rotates the hub, the gear mechanism also positively drives rotation of the applicator.

SUMMARY OF THE INVENTION

The present invention includes the recognition of certain deficiencies in previously-provided devices. Many recorder mechanisms include a device for sensing resistance to rotation of the hub drives or capstan. Such sensors are provided because increased resistance is often indicative of a malfunction. Many cleaning cassettes, however, include a cleaning tape which has a stiffness, weight, or friction coefficient greater than that of recording tape. Such cleaning tape provides a relatively high resistance to hub, head scanner, or capstan rotation and, in many cases, causes the sensors to disengage operation of the recorder prematurely.

Previous devices, such as that described in U.S. Pat. No. 4,811,149, issued Mar. 7, 1989, to Clausen, have included a locating pin positioned so that the cleaning ribbon engages the peripheral surface of the rotating drum or scanner along two contact locations of relatively short length. Although this provision of a locating pin has provided for some improvement, a number of recording machines have high susceptibility to premature shut-off. Accordingly, there is a need for additional improvements to such cassettes to prevent premature shut-off, as well as the undesirable level of noise which accompanies contact of the cleaning tape with the scanner head.

The present invention includes an apparatus for cleaning portions of a video cassette recorder, the recorder including a scanner, the scanner having a circumference; the apparatus comprising a housing; a feed reel and a takeup reel rotatably mounted in said housing; a cleaning tape extending between said feed reel and said takeup reel, and configured to contact said scanner along at least a first portion of said tape when said housing is inserted in said recorder; means for wetting at least part of said tape with the fluid; and means for guiding a second portion of said tape away from said scanner, wherein less than about 220° section of circumference of said scanner contacts said first portion; said tape comprising a polyester material.

BRIEF DESCRIPTION OF THE DRAWINGS

FIG. 1 shows a video recorder cleaning cassette, according to previous designs, and portions of a video cassette recorder in non-operating mode, with portions of the cassette broken away;

FIG. 2 is a cross-section taken along line 2—2 of FIG. 1;

FIG. 3 is a view similar to that of FIG. 1, with the cassette and VCR in an operating mode;

FIG. 4 is an elevational view of a guide post according to previous devices;

FIG. 5 shows a video cleaning cassette, according to the present invention, with portions broken away and with the cover door removed;

FIG. 6 is an elevational view of an applicator according to the present invention;

FIG. 7 shows the video cassette of FIG. 5 in engagement with portions of a video recorder in an operating mode;

DETAILED DESCRIPTION OF THE PREFERRED EMBODIMENT

As depicted in FIG. 1, previous cleaning cassettes 10 include a feed reel 12a and takeup reel 12b with a cleaning tape 14 extending therebetween. The cleaning tape 14 can be of a number of different materials, including a woven mixture of a polyester fiber, such as that sold under the trade name "Melinex ™" by Imperial Chemical Industries, Inc., and a polyamide polymer, such as nylon. Preferably, the woven material is backed to form a laminated tape, such as that sold under the trade name "Lamiglas ™" 1171, by Facile Co. Some cleaning tapes 14 have, in the past, been provided with a textured polyester (PET) material, such as that sold under the trade name "Mylar ®," available from E.I. Du Pont de Nemours & Co. The PET material, however, has previously been provided only for dry-cleaning (i.e., head cleaning in which the tape 14 is not wetted by a fluid) PET material has previously not been used for wet-cleaning because, when wetted, it tends to cling or adhere to the scanner 16 of a VCR such that, during rotation of the scanner 16, a wetted PET material will become wound around the scanner 16, causing jamming.

A number of guiding devices are located in the cassette 10 to establish a desired initial path for the tape 14. The tape 14 leaves the feed reel 12a and travels around a first locating pin 18. The tape 14 passes behind a locating roller 20 and in front of a second locating pin 22. An applicator 24 is positioned in the cassette 10 near the first locating pin 18, with its side in contact with the tape 14. As best seen in FIG. 2, the applicator 24 includes one or more wettable pads 26a, 26b, 26c. When the wettable pads 26a, 26b, 26c are wetted with a fluid, the fluid is transferred from the pads 26a, 26b, 26c to the surface of the tape 14 to assist in cleaning. A number of fluids can be used as a cleaning material, including trichlorotrifluorethane, freon, isopropyl alcohol, and mixtures thereof. Preferably, isopropyl alcohol is used.

In some previous devices, rotation of the first applicator 24 was by friction drive, i.e., friction between the moving tape 14 and the circumference of the applicator 24 caused rotation of the applicator 24. Such friction-rotated applicators, however, have been found to be subject to skipping such that the applicator 24 is not continuously rotated during movement of the tape 14, and, accordingly, the tape 14 is not evenly and continuously coated with the fluid. Previous devices, such as that shown in FIG. 1, have included mechanisms for positively driving the applicator 24. One such mechanism, depicted in FIG. 1, includes a toothed flange 28 connected by a gear 30 to a toothed flange 32 of one of the reels 12a. Thus, rotation of the reel 12a causes rotation of the gear 30 which, in turn, positively drives the applicator 24. Such provision of toothed flanges and gears, however, is relatively expensive.

In some previous devices, the applicator 24 is in the form of a hollow cylinder, and the pads 26a, 26b, 26c are in communication with the interior of the hollow cylinder. A hole 34 is provided through the housing wall 36 of the cassette 10. The user provides fluid through the hole 34 to the interior of the applicator 24 to wet the pads 26a, 26b, 26c.

Various portions of the video recorder position and guide the tape 14 during operation of the recorder. A capstan 38 and pinch roller 40 engage the tape 14, as shown in FIG. 3, and control its rate of longitudinal movement. First and second guide rollers 42, 44 and movable guide members 46, 48, 50, 52, 54, 56 engage the backside of the tape 14 and move it into the playing position shown in FIG. 3.

In previous devices, it has been found that the fluid applied by the applicator 24 is often partially or fully evaporated before the tape 14 has moved past the mechanisms to be cleaned, particularly the scanner 16, audio head 60, and capstan 38. The present invention involves positioning a second applicator for wetting the tape 14 in a second position downstream from the first applicator 24. In the preferred embodiment, the second applicator replaces the locating roller 20 (FIG. 4) so that the second applicator provides both a wetting function and a locating function for the tape 14.

FIG. 5 depicts a cassette according to the preferred embodiment of the present invention. In order to avoid skipping, which has been noted in previous friction-drive applicators, the present first applicator 66, although friction-driven, is provided with a guide member 68. The guide member 68 serves the purpose of modifying the path of the tape 14 so that it curves around a portion of the circumference 70 of the applicator 66, rather than being substantially tangential to the applicator, as in the prior devices depicted in FIG. 1. The guide member 68 is preferably a stationary or rotating post, although other devices could be used, such as walls, tracks, and the like.

By causing the tape 14 to contact the applicator 66 along a circumferential portion 70 of the applicator 66, a larger surface area of the applicator 66 is in contact with the tape 14. Because of the larger surface area, a greater frictional force is developed, resulting in substantially continuous rotation of the applicator 66 in response to movement of the tape 14. Such continuous rotation results in substantially even and continuous application of fluid to the tape 14.

In the preferred embodiment, fluid is applied to the applicator 66 not through opening 34 in the upper wall of the housing, as shown in FIG. 2, but, rather, through a hole through the sidewall 72, shown in FIG. 5. In this way, the fluid is not contained in the interior of the applicator, and thus need not find its way to the exterior pads 74a, 74b, 74c (FIG. 6) of the applicator 66. Preferably, a tube 76 connects the fluid hole 72 to the exterior of the applicator 66 to conduct fluid from the hole 72 to the applicator 66.

When the cassette depicted in FIG. 5 is inserted into a video recorder device, and cleaning is initiated by, e.g., pressing the "play" or "record" button (not shown), portions of the video recorder device move to position the tape in a cleaning position, as depicted in FIG. 7. As shown in FIG. 7, a second applicator 78 is provided, which is substantially similar to the configuration of the first applicator 66 depicted in FIG. 6. The second applicator 78 is rotatably mounted so as to contact the tape 14 in a position (with respect to the tape path) spaced from the position of the first applicator 66. In this manner, after the tape 14 has been wetted by the first applicator 66, and travels along the tape pathway and, after some or all of the fluid has evaporated, the tape contacts the second applicator 78 so that it will once again be wetted, and can thus be effective in cleaning downstream apparatus.

In the configuration depicted in FIGS. 5 and 7, the second applicator 78 is positioned to perform a second function of spacing a portion of the tape 14 away from the scanner 16. As seen in FIG. 7, the tape 14 contacts the scanner 16 along a first circumferential portion 80 thereof. The next portion of the tape 82 is positioned away from and out of contact with the scanner 16 by looping behind the second applicator 78. The following portion of tape is in contact with a second circumferential portion 84 of the scanner 16. The total section of the scanner circumference in contact with the tape 14 is less than about 220°, preferably less than about 180°.

As shown in FIG. 7, there is a portion of tape lying adjacent the first circumferential portion 80 of the scanner 16, which, with respect to the tape 14, lies between the first applicator 66 and the second applicator 78. The portion of tape 82 which loops behind and contacts the second applicator 78 lies between the first portion of tape in contact with the first circumferential portion 80 of the scanner 16 and a portion of tape in contact with the second circumferential portion 84 of the scanner 16.

The second applicator 78, similarly to the first applicator 66, is preferably not positively driven but, rather, is driven solely in response to friction with the moving tape 14. Preferably, the second applicator 78, similarly to the first applicator 66, is coupled to a device such as a hole 86, for applying fluid directly to the exterior of the applicator 78 without the necessity of providing fluid to the interior of the applicator. As with the first applicator 66, the second applicator 78 may be coupled to a device such as a tube 88 for conducting fluid to the exterior of the applicator 78.

By positioning the second applicator 78 in a manner such that the tape 14 is spaced from the scanner 16 in the region where fluid is reapplied to the tape 14, the cleaning device depicted in FIG. 5 can be used in connection with a PET tape. This is because, even though the rewetted PET tape would otherwise tend to grab or cling to the spinning scanner 16, the frictional forces and surface tension forces are reduced since a portion of the tape 82 is spaced from the scanner 16. Accordingly, the present cassette-cleaning device can be used in connection with wet-cleaning using a PET tape.

By wetting the tape in a second area and, particularly, in the portion 82 separated from the scanner 16, oxides and other materials removed from the recorder mechanism are deposited on a greater length of the tape 14, compared to previous devices, including the tape downstream from the second applicator 78. In previous devices, only the initial length, about two feet or less, of the tape typicallly contains a significant concentration of removed materials. In the present invention, up to four feet or more of the tape 14 contain a significant concentration of removed materials. Because redeposition of material from the tape onto the recorder mechanism is related to the concentration of the material on the tape 14, the present invention provides for lessened redeposition, since the removed material is distributed along a longer length of tape and thus has a lower concentration per unit length.

As will be apparent to those skilled in the art, the present invention provides a number of advantages. The fluid applicators yield a substantially continuous and an even coating of the tape 14, even though they are frictionally-driven rather than positively-driven. Greater cleaning is accomplished because the downstream portions of the recorder mechanism can be contacted with wetted cleaning tape, i.e., before the cleaning fluid evaporates from the surface of the tape. A lessened redeposition of cleaned material occurs.

Although the invention has been described by way of a preferred embodiment and certain variations and modifications, other variations and modifications will be apparent to those skilled in the art, the scope of the invention being set forth in the appended claims.

What is claimed is:

1. Apparatus for cleaning portions of a video cassette recorder, the recorder including a scanner, means for receiving a tape cassette, a device for drawing tape out of a cassette, received in the means for receiving, and for contacting the tape with at least a portion of the scanner and means for providing lengthwise movement of the tape, the apparatus comprising:
   a housing;
   a feed reel and a takeup reel rotatably mounted in said housing;
   a cleaning tape extending between said feed reel and said takeup reel, and configured, by the recorder to engage the scanner when said housing is inserted in the recorder;
   a first means, mounted in said housing, for storing fluid and applying the fluid to at last a first portion of said tape;
   a second means, mounted in said housing, for storing fluid and applying the fluid to at least a second portion of said tape spaced from said first portion;
   each of said first means and said second means also being a means for wetting at least a portion of said tape during a time when said tape is moving past said first means and second means, respectively.

2. Apparatus, as claimed in claim 1, wherein a third portion of said tape, between said first portion and said second portion, is in contact with said scanner.

3. Apparatus, as claimed in claim 2, wherein a fourth portion of said tape contacts said scanner, and wherein said second portion is between said third portion and said fourth portion.

4. Apparatus, as claimed in claim 1, wherein a region of said tape adjacent to said third portion is spaced from said scanner.

5. Apparatus for cleaning portions of a video cassette recorder, the recorder including a scanner, means for receiving a tape cassette, a device for drawing tape out of a cassette, received in the means for receiving, and for contacting the tape with at least a portion of the scanner and means for providing lengthwise movement of the tape, the apparatus comprising:
   a housing;
   a feed reel and a takeup reel rotatably mounted in said housing;
   a cleaning tape extending between said feed reel and said takeup reel, and configured, by the recorder to engage the scanner when said housing is inserted in the recorder;
   a first means, mounted in said housing, for storing fluid and applying the fluid to at least a first portion of said tape;
   a second means, mounted in said housing, for storing fluid and applying the fluid to at least a second portion of said tape spaced from said first portion;
   each of said first means and said second means also being a means for wetting at least a portion of said tape during a time when said tape is moving past said first means and second means, respectively;
   wherein at least said first means is rotatable solely in response to friction between said tape and said first means when said tape is moved lengthwise.

6. Apparatus, as claimed in claim 1, further comprising means, mounted in said housing, for applying fluid to an exterior surface of said first means.

7. Apparatus for cleaning portions of a video cassette recorder, the recorder including a scanner, the scanner having a circumference, means for receiving a tape cassette, a device for drawing tape out of a cassette, received in the means for receiving, and for contacting the tape with at least a portion of the scanner and means for providing lengthwise movement of the tape, the apparatus comprising:
   a housing;
   a feed reel and a takeup reel rotatably mounted in said housing;
   a cleaning tape extending between said feed reel and said takeup reel, and configured, by the recorder, to contact said scanner along at least a first portion of said tape when said housing is inserted in the recorder;
   means, mounted in said housing, for wetting at least part of said tape with the fluid; and
   means, mounted in said housing, for guiding a second portion of said tape away from said scanner, wherein less than about a 220° section of circumference of said scanner contacts said first portion; said tape comprising a polyester material.

8. Apparatus, as claimed in claim 7, wherein a third portion of tape contacts said scanner, and wherein said second portion is between said first portion and said third portion.

9. Apparatus, as claimed in claim 7, wherein said means for guiding includes mans for wetting at least part of said tape with the fluid.

10. Apparatus for cleaning portions of a video cassette recorder including a scanner, means for receiving a tape cassette, a device for drawing tape out of a cassette, received in the means for receiving, and for contacting the tape with at least a portion of the scanner and means for providing lengthwise movement of the tape, the apparatus comprising:
   a housing;
   a feed reed and a takeup reel rotatably mounted in said housing;
   a cleaning tape extending between said feed reel and said takeup reel and configured by the recorder to engage the scanner when said housing is inserted in the recorder;
   first rotatable means, mounted in said housing, for wetting at least a portion of said tape, said first means having a circumference; and
   second means mounted in said housing for guiding said tape to contact a sufficient portion of said circumference of said first means to cause substantially continuous rotation of said first means when said tape is moved longitudinally.

11. Apparatus, as claimed in claim 10, wherein said second means includes a post.

12. A method for cleaning portions of a video cassette recorder, the recorder including a scanner, means for receiving a tape cassette, a device for drawing tape out of a cassette, received in the means for receiving, and for contacting the tape with at least a portion of the scanner and means for providing lengthwise movement of the tape, the method comprising:
   providing a housing with a feed reel and a takeup reel rotatably mounted in said housing and with a cleaning tape extending between said feed reel and said takeup reel;
   providing first and second fluid applicators mounted in said housing;
   contacting at least a portion of said scanner with a portion of said tape, using the recorder;
   wetting at least a first portion of said tape with a fluid using said first fluid applicator; and
   wetting at least a second portion of said tape with a fluid, using said second fluid applicator said second portion being spaced from said first portion.

13. A method, as claimed in claim 12, further comprising contacting a third portion of said tape with said scanner between said first portion of said tape and said second portion of said tape.

14. A method, as claimed in claim 12, further comprising contacting a fourth portion of said tape with said scanner, wherein said second portion is between said third portion and said fourth portion.

15. A method, as claimed in claim 12, further comprising spacing a portion of tape from said scanner, said portion being adjacent to said third portion.

16. A method for cleaning portions of a video cassette recorder, the recorder including a scanner means for receiving a tape cassette, a device for drawing tape out of cassette, received in the means for receiving, and for contacting the tape with at least a portion of the scanner and means for providing lengthwise movement of the tape, the method comprising:
   providing a housing with a feed reel and a takeup reel rotatably mounted in said housing and with a cleaning tape extending between said feed reel and said takeup reel;
   providing first and second fluid applicators mounted in said housing;
   contacting at least a portion of said scanner with a portion of said tape, using the recorder;
   wetting at least a first portion of said tape with a fluid using said first fluid applicator;
   wetting at least a second portion of said tape with a fluid, using said second fluid applicator said second portion being spaced from said first portion; and
   rotating a fluid applicator solely in response to friction between said tape and said first means when said tape is moved lengthwise.

17. A method, as claimed in claim 12, further comprising applying fluid to an exterior surface of at least one of said first and second fluid applicators housed in said housing.

18. Apparatus for cleaning portions of a video cassette recorder, the recorder including a region for receiving a tape cassette, a device for drawing tape out of a cassette when received in the region for receiving, and for contacting the tape with at least a portion of the scanner and a drive mechanism for providing lengthwise movement of the tape, the apparatus comprising:
   a housing;
   a feed reel and a takeup reel rotatably mounted in said housing;
   a cleaning tape extending between said feed reel and said takeup reel and configured by the recorder to engage the scanner when the housing is inserted in the recorder;
   a first fluid applicator mounted in the housing in a position to contact at least first portion of said tape when said tape is configured to engage the scanner;
   a second fluid applicator, mounted in the housing in a position to contact a second portion of said tape, spaced from said first portion, when said tape is configured to engage the scanner;
   each of the first applicator and second applicator positioned to contact the tape for wetting at least a portion of said tape during the time when said tape is moving past said first applicator and second applicator respectively.

19. Apparatus for cleaning portions of a video cassette recorder, the recorder including a scanner, the scanner having a circumference, means for receiving a tape cassette, a device for drawing tape out of a cassette received in the means for receiving, and for contacting the tape with the least a portion of the scanner and a drive mechanism for providing lengthwise movement of the tape, the apparatus comprising:
   a housing;
   a feed reel and a takeup reel rotatably mounted in said housing;
   a cleaning tape extending between said feed reel and said takeup reel, and configured by the recorder, to contact said scanner along at least a first portion of said tape when said housing is inserted in the recorder;
   means, mounted in said housing, for wetting at least part of said tape with the fluid, said means being rotatable solely in response to friction between said tape and said first means when said tape is moved lengthwise; and
   means, mounted in said housing, for guiding a second portion of said tape away from said scanner, wherein less than about a 220° section of circumference of said scanner contacts said first portion; said tape comprising a polyester material.

20. Apparatus, as claimed in claim 10, wherein said second means includes a first guiding device positioned such that a portion of said cleaning tape contacts said first guiding device before said portion contacts said first rotatable means.

21. Apparatus, as claimed in claim 20, wherein said second means further comprises:
a second guiding device positioned in said housing, such that said portion of said tape contacts said second guiding device after contacting said first rotatable means.

* * * * *